(12) United States Patent
Doerre et al.

(10) Patent No.: US 7,299,224 B2
(45) Date of Patent: Nov. 20, 2007

(54) METHOD AND INFRASTRUCTURE FOR PROCESSING QUERIES IN A DATABASE

(75) Inventors: Jochen Doerre, Boeblingen (DE); Monika Matschke, Calw (DE); Roland Seiffert, Herrenberg (DE); Matthias Tschaffler, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 10/926,591

(22) Filed: Aug. 26, 2004

(65) Prior Publication Data

US 2005/0138024 A1 Jun. 23, 2005

(30) Foreign Application Priority Data

Dec. 19, 2003 (EP) .................... 03104840

(51) Int. Cl.
*G06F 17/30* (2006.01)
(52) U.S. Cl. .................................... 707/4
(58) Field of Classification Search ............ 707/1, 707/2, 3, 10, 200, 4; 709/224
See application file for complete search history.

(56) References Cited

U.S. PATENT DOCUMENTS 6,546,381 B1 * 4/2003 Subramanian et al. ......... 707/2

* cited by examiner

*Primary Examiner*—Etienne Leroux
(74) *Attorney, Agent, or Firm*—Mark S. Walker; Gregory K. Goshorn; Greg Goshorn, P.C.

(57) ABSTRACT

Provided is a method for processing queries in a database in which data records have a parametric object and an extension of a nonparametric data type. A query includes a parametric condition for the parametric object of the data records and a nonparametric condition for the nonparametric extension of the data records. Parametric information of each data record is translated into constructs of the data type of the extension. A parametric result set of data records for the parametric condition is generated. The parametric condition of said query is translated into a filter condition for said constructs of the data type of the extension. The nonparametric condition of said query and said filter condition are employed to generate a nonparametric result set. The parametric result set and the nonparametric result set are joined to obtain a result set.

20 Claims, 3 Drawing Sheets

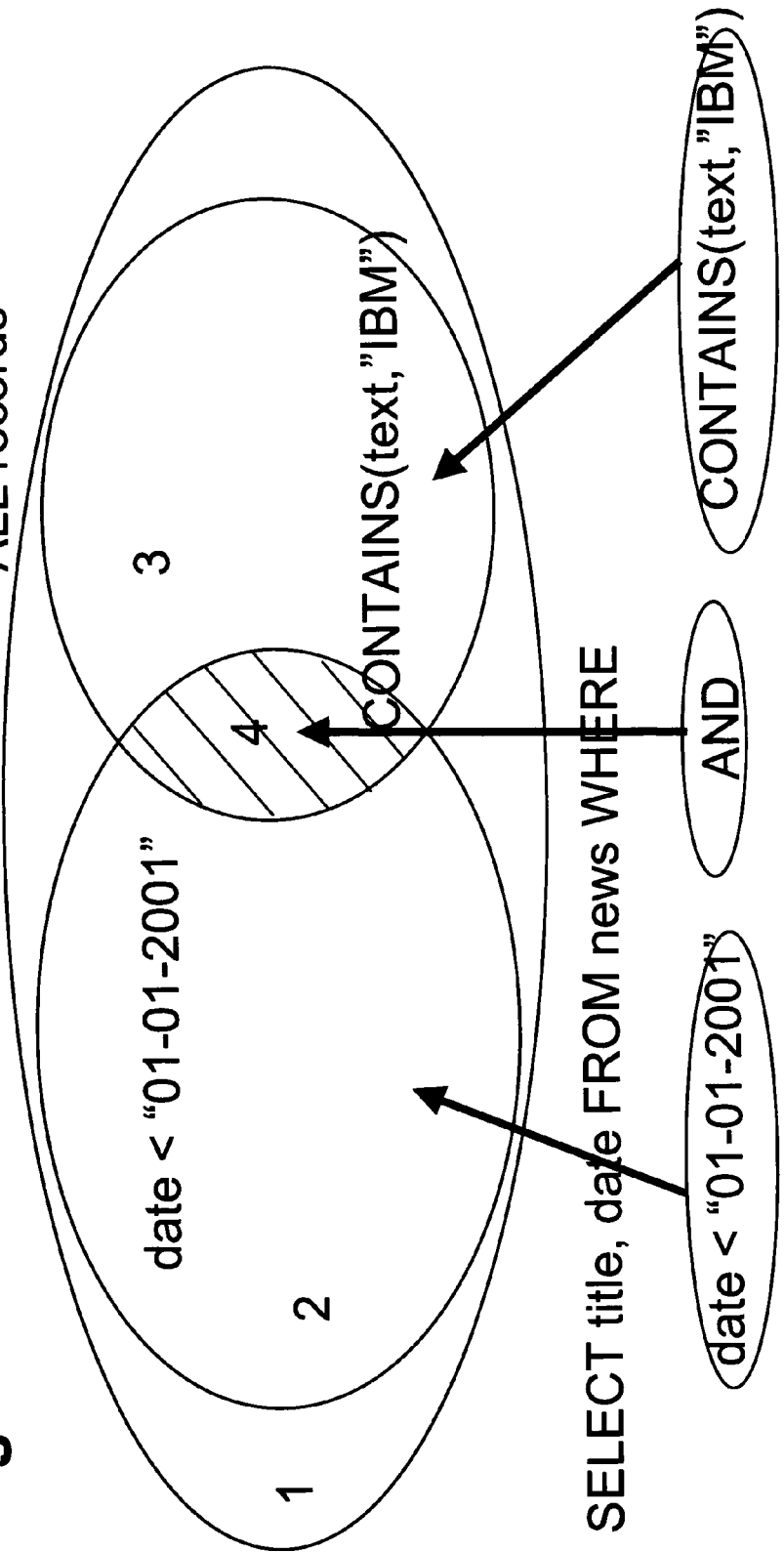

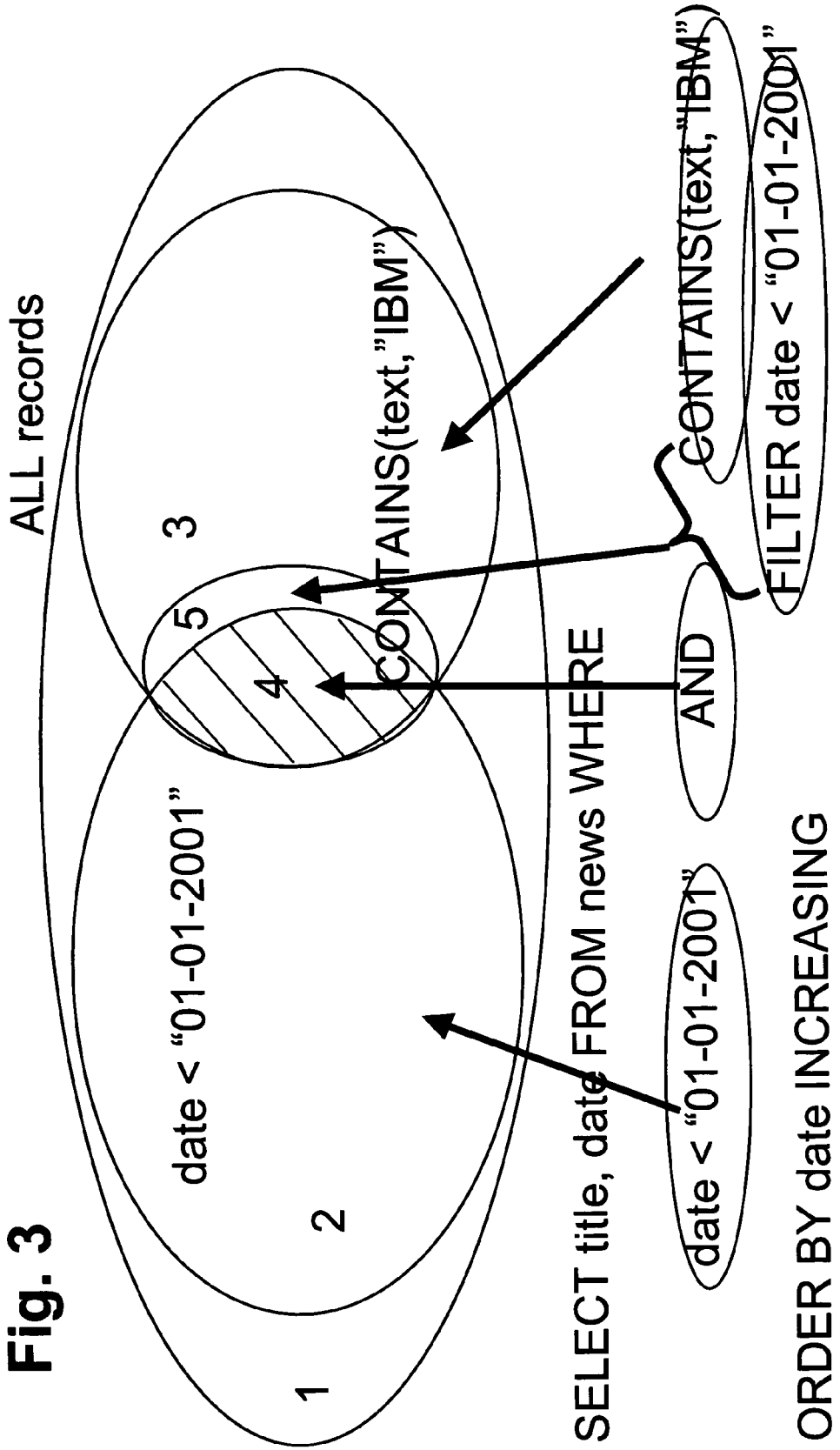

METHOD AND INFRASTRUCTURE FOR PROCESSING QUERIES IN A DATABASE

BACKGROUND OF THE INVENTION

1. Field of the Invention

The present invention relates to a method and an infrastructure for processing queries in a database. Particularly, the present invention relates to a method and an infrastructure for processing queries in standard relational database management systems (DBMSs) having at least one extension of objects of a nonparametric datatype, like text, images, audio and video.

2. Description of the Related Art

Object-relational extensions to DBMSs are state of the art. They allow the extension of a standard relational database system with specialized support for new, nonparametric types of objects. Important examples of such new datatypes include text, images, audio and video.

By now, the only provision to add support for a new datatype, e.g. "text", is to make this datatype known to the database system. Then, the data records of the database system may contain objects of this new datatype. The database will store these objects—but it does not know how to "process" them. So they are considered as unstructured binary data. Additional methods have to be provided to implement functionality, e.g. an equality predicate", for these objects of a new datatype. The database system needs this functionality for any query including a condition for the objects of the new datatype. In general, the database query language, i.e. SQL in relational DBMSs, will be extended to provide means for searching on objects of the new datatypes. E.g. SQL/MM is an extension of SQL for relational DBMSs with multimedia extensions. For example, in case of the datatype "text", there may be a new predicate "CONTAINS (column, word)" that returns true, if the "text" in the record/column under consideration actually contains the specified word.

As usual in DBMSs, the efficient execution of such a query, e.g. "CONTAINS", requires an index for the data. These indexes are usually not native DBMS indexes, but they are special purpose indexes designed to provide high performance query processing for the new datatype they apply to. In case of "text", such an index usually has an "inverted structure", i.e. for each word occurring in all indexed text, there is a "list" of the actual occurrences, for example a TextIndexID for the record that contains the word and even position information within the text object. These indexes can now perform text searches very fast.

In order to explain the problem addressed in the invention, the state of the art for processing a query which combines conditions on objects of a new datatype with conditions on regular parametric objects will be described by means of the following example in conjunction with FIGS. 1 and 2 of the drawings.

FIG. 1 shows a database 10 called NEWS table. Each data record of database 10 comprises a RecordID, a Title, a Text object and a Date. The block diagram of FIG. 1 illustrates the processing of the following query on database 10, as it is state of the art.

SELECT title, date FROM news WHERE
date<"01-01-2001" AND CONTAINS(text, "IBM")
ORDER BY date INCREASING This query combines a text search, representing a condition on the text objects of the data records, with a numeric condition, which means a condition on the regular parametric objects of the data records. Besides, the result set of said query has to be sorted by the parametric data.

By now, the query processing has to implement the following steps:

1. SELECT A={records X|date(X)<'01-01-2001'} The DBMS computes a Result set 20 for the parametric condition 'date<"01-01-2001"'.
2. SELECT B={records X|CONTAINS(X, text, 'IBM')} The text extension engine computes a result set for 'CONTAINS(text, "IBM")'—in the here described example—as in most cases—this result set is a Text index list 30 of text-internal IDs, therefore
3. these text-internal IDs of Text index list 30 have to be mapped to the RecordIDs of the DBMS by using an ID map 40.
4. As result of this mapping an intermediate result table 50 is constructed.
5. The parametric Result set 20 and the intermediate result table 50, representing the text result set, have to be joined which means intersected. The join function is indicated by arrow 60 of FIG. 1.
6. The result of this step has to be ordered and the data requested in SELECT(title, date) has to be fetched from the intermediate result table 50.

It is also possible to do the sorting before joining the two result sets to order the parametric Result set 20 and the TVF result table 50 separately.

The diagram of FIG. 2 illustrates the different result sets of the processing steps described above. Set 1 represents all data records of NEWS table 10. Subset 2 represents the parametric Result set 20 obtained in step 2 of the query processing, while subset 3 represents the text result set obtained in steps 2 to 4 of the query processing. Subset 4 is the intersection of subsets 2 and 3 and represents the result of the join operation 60 in step 5 of the query processing.

The completely independent processing of the "parametric" and "text" subqueries and especially the joining of their result sets causes severe performance problems, as in most cases the intermediate result sets are large on either side. This is especially on the "text" side disadvantageous, because the performance of text search engines usually depends more on the size of the result set than on the overall amount of text indexed.

In order to tune this model of processing, it has been proposed to enhance the extension engine for the new datatype with full support for at least the most commonly used existing DBMS data types. This would allow to push down the parametric constraint into the external query. However, this approach has many severe drawbacks:

1. It requires a fully redundant implementation of DBMS-internal datatypes in the extension engine which should focus on the aspects of the new datatype. This makes the extension engine much more complex and violates the idea of encapsulation of precisely the functionality related to the new datatype.
2. Index structures in the extension are chosen to reflect the properties of the object types represented. The index structures needed to support regular datatypes are not necessarily available in this context. Besides, the processing of additional parametric constraints inside the extension is not in any case very efficient. E.g. inverted indexes and standard B-trees for numeric data are handled and processed quite differently. So a lot of complexity has to be added to implement a combination. DBMSs have many different ways to optimally implement combined queries of their indexes, e.g.

different join strategies, etc. It seems hopeless to rebuild all that outside the database.

3. Indexes maintained by the extension are usually not managed by the DBMS. Therefore, advantages that the DBMS can use for query processing, e.g. caching in the DBMS buffer pool, are lost. This is already an issue for the new data types and their indexes themselves, but now even indexes already present inside the DBMS are fully replicated and processed outside.

4. This work has to be repeated for each datatype added as an extension.

OBJECT OF THE INVENTION

Starting from this, the object of the present invention is to provide a method and an infrastructure for processing such combined queries in a DBMS with an extension of a new datatype, wherein the problem of joining the result sets of the parametric and the nonparametric subqueries is significantly reduced without adding the complexity of the DBMS to the extension engine.

BRIEF SUMMARY OF THE INVENTION

The foregoing object is achieved by a method and an infrastructure as laid out in the independent claims. Further advantageous embodiments of the present invention are described in the subclaims and are taught in the following description.

As mentioned above, the present invention relates to a method for processing queries in a database of data records, wherein each data record comprises at least one parametric object with parametric information and at least one extension of a nonparametric datatype. According to the present invention, at least parts of the parametric information of each data record are translated into constructs of the datatype of the extension. The present invention applies to queries comprising at least one parametric condition for the parametric object of the data records and at least one nonparametric condition for the nonparametric extension of the data records. For processing this kind of queries, the parametric condition is translated into at least one filter condition for said constructs of the datatype of the extension. Then, a nonparametric result set of data records is computed considering both, the nonparametric condition of said query and said filter condition. Besides, a parametric result set of data records is computed for the parametric condition. Finally, the parametric result set and the nonparametric result set are joined to obtain a result set for the query as a whole.

One key aspect of the present invention is the so-called translation of the parametric information into appropriate constructs, which can be processed by means of the extension engine using the properties and index structures of the corresponding new datatype. In an advantageous embodiment of the invention the constructs produced by the corresponding translation function are added to the index supporting query processing of the extension.

Another key aspect of the present invention is the so-called translation of the parametric conditions of a query. The corresponding translation function produces filter conditions which can operate upon the newly created constructs of the extension.

The so-created filter conditions can be handled separately by the extension engine processing a query. Another possibility providing good processing performance is to include the filter conditions in the nonparametric condition of a query.

Theoretically, the method according to the present invention could use a translation function that creates constructs of the datatype of the extension representing the whole parametric information of the corresponding data records. As the complexity of the translation function and the complexity of the resultant constructs would increase dramatically with the amount of parametric information to be translated, a very advantages embodiment of the present invention uses a translation function which only provides an approximation instead of an exact translation of the parametric information. In this case the resultant constructs only provide an approximation of the corresponding parametric information. This kind of translation leads to a classification of the data records according to their parametric information.

In order to enhance the processing performance, the translation function for translating the parametric information can consider the distribution of the data records in the database with respect to their parametric information to obtain an approximately equal number of data records in each resulting class of data records.

Only if said constructs of the extension represent the whole corresponding parametric information of the data records an exact translation of the parametric conditions of a query makes sense. Therefore, in most cases also the filter conditions only provide an approximation of the corresponding parametric condition.

One major advantage of the present invention is that the translation of at least parts of the parametric information of a data record has only to be done once. As the resultant constructs are then stored they are immediately available for each query. The creation of said constructs can easily be done together with indexing of the corresponding data records, for example during loading of the database or when the corresponding data records are added to the database.

Besides, the present invention provides an infrastructure for processing combined queries, as described above. Therefore the infrastructure comprises at least a database management system (DBMS) for handling the parametric objects of the data records and at least one extension engine for handling the extensions of the data records. This extension engine provides at least one first translation function for translating at least parts of the parametric information of the data records into constructs supported by said extension engine and at least one second translation function for translating parametric conditions of queries into filter conditions for said constructs.

BRIEF DESCRIPTION OF THE SEVERAL VIEWS OF THE DRAWINGS

The novel features of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 2 shows a diagram illustrating the different result sets of the processing steps explained in conjunction with FIG. 1; and FIG. 3 shows a diagram, which illustrates the different result sets, when processing the query of FIG. 1 according to the present invention.

DETAILED DESCRIPTION OF THE INVENTION

Figure 1:
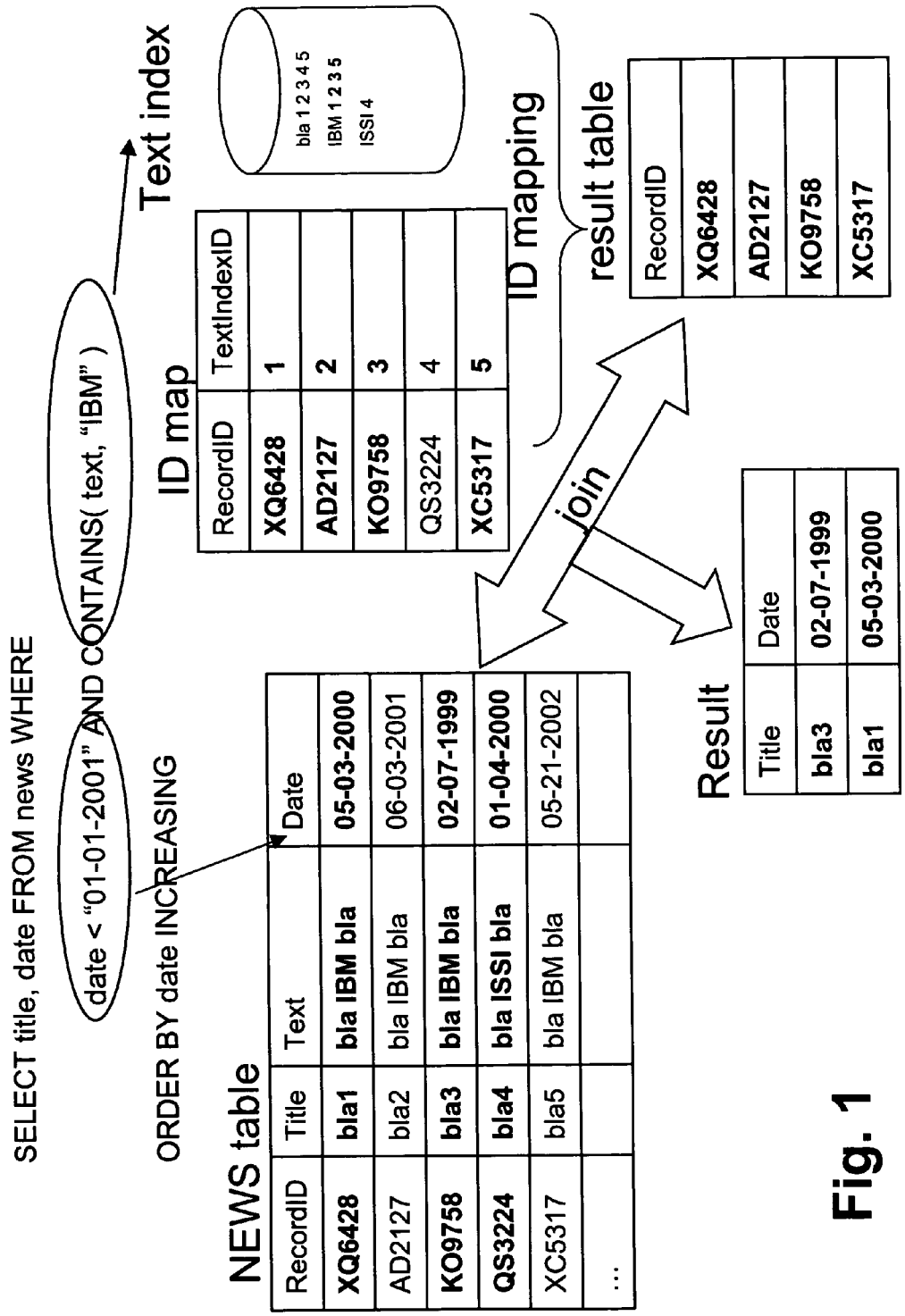
FIG. 1 shows a block diagram illustrating the state of the art for processing a query in a database, wherein each data record comprises a text object in addition to parametric objects and wherein the query combines conditions on the text objects with conditions on the parametric objects.

The invention and especially the differences between query processing according to the invention and query processing, as it is state of the art, will be explained by means of the query SELECT title, date FROM news WHERE
date<"01-01-2001" AND CONTAINS(text, "IBM")
ORDER BY date INCREASING exemplified in conjunction with FIGS. 1 and 2. As mentioned above, the data records of the corresponding database NEWS table 10 comprise a RecordID and a regular parametric object representing a Date. Besides, the data records comprise two extensions of a nonparametric datatype, a first Text object and a second text object representing the Title of said Text object. The query, here explained, combines a text search, representing a condition on the text objects of the data records, with a numeric condition, which means a condition on the regular parametric object Date of the data records. In addition, the result set of said query has to be sorted by the parametric data.

Implementation of the invention comprises the following steps:

1. The columns containing the text objects have to be made known to the DBMS for appropriate handling during indexing and querying.
2. A translation function for the parametric data "Date" has to be provided by the implementation of the extension engine, since only the extension engine knows appropriate translations of parametric approximation to its actual data structures.
3. This translation function will be called during indexing of the text objects for translation of all additional parametric data items in the data record that should participate in the optimization of a query. The result of that translation will be included in the TEXT data passed to the extension engine for indexing.
4. During query optimization, the DBMS optimizer detects situations in which parametric conditions are combined, especially intersected and joined, with conditions on the text objects, as in the here described example.
5. Therefore, a translation function for parametric conditions is provided by the implementation of the extension engine which generates corresponding filter conditions for the translated parametric data items. It should be mentioned here, that the translation of parametric conditions can also be done manually.
6. In case of the query, here exemplified, this translation function is called and will then re-write the text condition 'CONTAINS' to a new modified text condition 'NEW-CONTAINS' including the generated filter condition for the translation of the parametric objects "Date". The resulting query will be:

SELECT title, date FROM news WHERE
date<"01-01-2001" AND
NEW—CONTAINS(mod-text,
 "'IBM' AND date-constraint:'before(01-01-2001)'")
ORDER BY date INCREASING The translation of the parametric condition of a query can be pushed down mostly into the 'CONTAINS' function itself. Then, the actual generation of the resulting query will be done as part of the text engine query processing.

One aspect of the invention is, how parametric information is translated into easily supported constructs in the new datatype extension. This depends largely on the structure of the index that supports the new datatype. In the case of text, it is advantageous to exploit the "inverted structure" by adding additional index terms that represent the parametric value. If, for example, an "integer" parametric attribute has to be represented in the text index for filtering and the actual range in the parametric data is MIN to MAX, this interval can recursively be split into equal length sub-intervals. Then, each interval can be represented by a token or index term at each level. This can be done up to the level of granularity required for effective filtering.

The idea of effective filtering by processing a query is to reduce the partial result of the nonparametric subquery so much, that based on the filter condition, representing a parametric constraint, there are so few "non-hits" in it, that the overhead of processing them is minimal in relation to the overall query cost.

The translation of parametric information into constructs of a text extension engine will be explained by means of the following example.

A numeric field NUM shall be used for filtering and has the range 0 to 100.000. There are 100 million data records to be indexed. Assuming equal distribution of values, each value occurs 1000 times. Then, the following range splitting can be done:

| Level | Range | Token | Records |
|---|---|---|---|
| Level 1: | 0-50.000 | NUM-0 | 50M records |
|  | 50.001-100.000 | NUM-1 |  |
| Level 2: | 0-25.000 | NUM-0-0 | 25M records |
|  | 25.001-50.000 | NUM-0-1 |  |
|  | 50.001-75.000 | NUM-1-0 |  |
|  | 75.001-100.000 | NUM-1-1 |  |
| Level 3: | 0-12.500 | NUM-0-0-0 | 12.5M records |
|  | . |  |  |
| Level 4: | 0-6.250 | NUM-0-0-0-0 | 6.25M records |
|  | . |  |  |
| Level 5: | 0-3.125 | NUM-0-0-0-0-0 | 3.125M records |
|  | . |  |  |

-continued

| Level 6: | 0-1.560 | NUM-0-0-0-0-0-0 | 1.56M records |
| Level 7: | 0-780 | NUM-0-0-0-0-0-0-0 | 780k records |
| Level 8: | 0-390 | NUM-0-0-0-0-0-0-0-0 | 390k records |
| Level 9: | 0-195 | NUM-0-0-0-0-0-0-0-0-0 | 195k records |
| Level 10: | 0-97 | NUM-0-0-0-0-0-0-0-0-0-0 | 97k records |
| Level 11: | 0-48 | NUM-0-0-0-0-0-0-0-0-0-0-0 | 48k records |

For each record, that is indexed, index terms are added, that represent the actual value of NUM in this record. Therefore, the tokens for all intervals the number lies in are added. Thus, e.g. the encoding for the numeric value "5" would be

NUM-0 NUM-0-0 NUM-0-0-0 NUM-0-0-0-0 NUM-0-0-0-0-0

NUM-0-0-0-0-0-0 NUM-0-0-0-0-0-0-0 NUM-0-0-0-0-0-0-0-0

NUM-0-0-0-0-0-0-0-0-0 NUM-0-0-0-0-0-0-0-0-0-0

NUM-0-0-0-0-0-0-0-0-0-0-0

This simple scheme can be optimized further by performing a distribution analysis over the parametric attribute. Then, the ranges can be split so that they represent approximately equal numbers of data points.

In query processing according to the invention a numeric condition of a query, e.g. a range expression, will be mapped to a minimal disjunction of index terms that covers the range as precisely as possible given the encoding chosen above.

Then, the encoding of a range constraint for NUM [10.000 . . . 25.000] would be

|    | NUM-0- . . . | for [12.501-25.000] |
| OR | NUM-0- . . . | for [10.937-12.500] |
| OR | NUM-0- . . . | for [10.157-10.936] |

Further down in the above list of OR terms, the actual number of occurrences of the term becomes smaller. So, adding more of these terms to the disjunction does not present a performance issue for the text engine.

Thus, the overall query the text engine has to evaluate in the example discussed in conjunction with FIG. 1 has the following structure

'IBM' AND ('NUM-0- . . . ' OR 'NUM-0- . . . ' OR 'NUM-0- . . . ')

Assume 'IBM' is a very frequently used word in the collection of 100 million documents being searched, e.g. it occurs in about 20% of all documents. The values for NUM are equally distributed, so the range constraint selects 15% of the records. Then, the total result set comprises 3 million data records assuming statistical independence of the two parts.

By query processing, as it is state of the art, 15 million data records are selected by the numeric range constraint and have to be intersected with 20 million data records selected by the text extension engine. This will be done by the DBMS join function after creating an intermediate table (ID map 40) of 20 million entries. As usually this intermediate table is not indexed it has to be sorted for execution of the join function. If the intersection leaves only 3 million data records, then 17 million data records have been materialized in the temp space, have been sorted, etc. just to be removed again.

According to the invention, the text extension engine can filter its result significantly. The encoding of the numeric information chosen in the here described example has 11 levels and goes down to a granularity of 48 k records. This results in a maximum "error" of delivering 48.000 records through the temp table that are not actually part of the result.

This aspect of the invention is also illustrated in the diagram of FIG. 3. As in FIG. 2, set 1 represents all data records of NEWS table 10. Subset 2 represents the result set for the numeric condition 'date<"01-01-2001"' and subset 3 represents the result set of the text search 'CONTAINS(text, "IBM")'. In addition to FIG. 2, the diagram of FIG. 3 shows a third subset 5 representing the result set of the re-written text condition 'NEW-CONTAINS(mod-text, "'IBM' AND date-constraint: 'before(01-01-2001)'")'. Therefore, the parametric condition 'date<"01-01-2001"' has been copied as a filter constraint to the text search condition. This kind of filter acts like a Boolean "AND". It produces a nonparametric result set, namely subset 5, which is far smaller than subset 3. According to the invention, it is not required that the text extension engine implements the parametric condition of a query fully. It may approximate the parametric condition with internal filters that can be efficiently implemented on the text index structures. That is the reason, why subset 5 is not identical to result set 4 but a superset of result set 4 of the query as a whole. It can now easily be evaluated as intersection of subsets 2 and 5 which is identical with the intersection of subsets 2 and 3.

Finally, it shall be pointed out, that the invention also applies to other nonparametric datatypes than TEXT. For example, in an IMAGE extension numeric ranges could be encoded as simple, easy to process "image patterns" that are made part of the actual image to be indexed. The core idea remains to do "approximations" for parametric conditions with index structures already available in the extension engine.

Parts List

| | |
|---|---|
| 1 | Set of all data records of database 10 |
| 2 | Subset - parametric result set 20 |
| 3 | Subset - text result set |
| 4 | Intersection of subsets 2 and 3 |
| 5 | Subset - result set of the filtering |
| 10 | database NEWS table |
| 20 | parametric Result set |
| 30 | Text index list |
| 40 | ID map |
| 50 | result table |
| 60 | join function |

The invention claimed is:

1. A method for processing queries in a database, comprising:
   computing a parametric result set, corresponding to a parametric condition, from a set of parametric data records of the database;
   translating the parametric condition into a filter condition corresponding to a data type construct of a set of nonparametric data records of a nonparametric extension of the database;
   computing a nonparametric result set, based on both a nonparametric condition and the filter condition, from the set of nonparametric data records of the database corresponding to the nonparametric extension of the database; and
   joining the parametric result set and the nonparametric result set to obtain a joined result set.

2. The method according to claim 1, further comprising indexing based upon the data type construct to support the computing of the nonparametric result set.

3. The method according to claim 1, wherein the construct of the extension provides an approximation of the corresponding parametric information so that the translation of the parametric information leads to a classification of the nonparametric data records into classes according to their parametric information.

4. The method according to claim 3, wherein the translation function for translating the parametric information considers the distribution of the data records in the database with respect to their parametric information to obtain an approximately equal number of data records in each resulting class of nonparametric data records.

5. The method according to claim 1, wherein said filter condition is based upon an approximation of the corresponding parametric condition.

6. The method according to claim 1, wherein the translation of the parametric information of a data record into constructs of the extension is executed with indexing of the nonparametric data records.

7. The method according to claim 6, wherein the translation is executed when a nonparametric data record is added to the nonparametric extension of the database.

8. A database management system (DBMS) for processing queries in a database, comprising:
   parametric data records stored in the database;
   nonparametric data records stored in an extension of the database;
   logic for computing a parametric result set, corresponding to a parametric
   condition, from the parametric data records of the database;
   logic for translating the parametric condition into a filter condition corresponding to a data type construct of the nonparametric data records;
   logic for computing a nonparametric result set, based on both a nonparametric condition and the filter condition, from the set of nonparametric data records; and
   logic for joining the parametric result set and the nonparametric result set to obtain a joined result set.

9. The DBMS of claim 8, further comprising an index based upon the data type construct to support the logic for computing of the nonparametric result set.

10. The DBMS according to claim 8, further comprising an approximation of the corresponding parametric information for classifying the nonparametric data records into classes according to their parametric information.

11. The DBMS according to claim 10, wherein the translation function for translating the parametric information considers the distribution of the data records in the database with respect to their parametric information to obtain an approximately equal number of data records in each resulting class of nonparametric data records.

12. The DBSM according to claim 8, wherein the filter condition is based upon an approximation of the corresponding parametric condition.

13. The DBMS according to claim 8, wherein the translation of the parametric information of a data record into constructs of the extension is executed with indexing of the nonparametric data records.

14. The DBMS according to claim 13, wherein the translation is executed when a nonparametric data record is added to the nonparametric extension of the database.

15. A computer programming product for processing queries in a database, comprising:
   a memory;
   logic, stored on the memory for execution on a processor, for computing a parametric result set, corresponding to a parametric condition, from a set of parametric data records of the database;
   logic, stored on the memory for execution on the processor, for translating the parametric condition into a filter condition corresponding to a data type construct of a set of nonparametric data records of a nonparametric extension of the database;
   logic, stored on the memory for execution on the processor, for computing a nonparametric result set, based on both a nonparametric condition and the filter condition, from the set of nonparametric data records of the database corresponding to the nonparametric extension of the database; and
   logic, stored on the memory for execution on the processor, for joining the parametric result set and the nonparametric result set to obtain a joined result set.

16. The computer programming product according to claim 15, further comprising logic, stored on the memory for execution on the processor, for indexing based upon the data type construct to support the computing of the nonparametric result set.

17. The computer programming product according to claim 15, wherein the construct of the extension provides an approximation of the corresponding parametric information so that the translation of the parametric information leads to a classification of the nonparametric data records into classes according to their parametric information.

18. The computer programming product according to claim 17, wherein the translation function for translating the parametric information considers the distribution of the data records in the database with respect to their parametric information to obtain an approximately equal number of data records in each resulting class of nonparametric data records.

19. The computer programming product according to claim 15, wherein said filter condition is based upon an approximation of the corresponding parametric condition.

20. The computer programming product according to claim 15, wherein the translation of the parametric information of a data record into constructs of the extension is excuted with indexing of the nonparametric data records.

* * * * *